Oct. 31, 1933.  W. M. KEENAN  1,932,467
MANUFACTURE OF CEMENT
Filed July 17, 1928  4 Sheets-Sheet 1

INVENTOR
Walter M. Keenan
BY
Anthony Usina
ATTORNEY

Oct. 31, 1933. W. M. KEENAN 1,932,467
MANUFACTURE OF CEMENT
Filed July 17, 1928 4 Sheets—Sheet 2

INVENTOR
Walter M. Keenan
BY
Anthony Usina
ATTORNEY

Oct. 31, 1933.   W. M. KEENAN   1,932,467
MANUFACTURE OF CEMENT
Filed July 17, 1928    4 Sheets-Sheet 4

INVENTOR
*Walter M. Keenan*
BY
*D. Anthony Usina*
ATTORNEY

Patented Oct. 31, 1933

1,932,467

UNITED STATES PATENT OFFICE 1,932,467

MANUFACTURE OF CEMENT

Walter M. Keenan, New York, N. Y., assignor, by mesne assignments, to Metropolitan Engineering Company, a corporation of New York Application July 17, 1928. Serial No. 293,434

2 Claims. (Cl. 222—7)

The object of the invention is to effect economy of fuel in the production of cement. The usual method of producing hydraulic cement is to pass the ground material through a long inclined rotary kiln and to pass combustion gases through the kiln in the opposite direction.

My invention provides for the operating of such a method with considerable economy of fuel.

The accompanying drawings illustrate embodiments of the invention diagrammatically. The details of such apparatus are well known and may be of any usual or suitable design.

Figure 1:
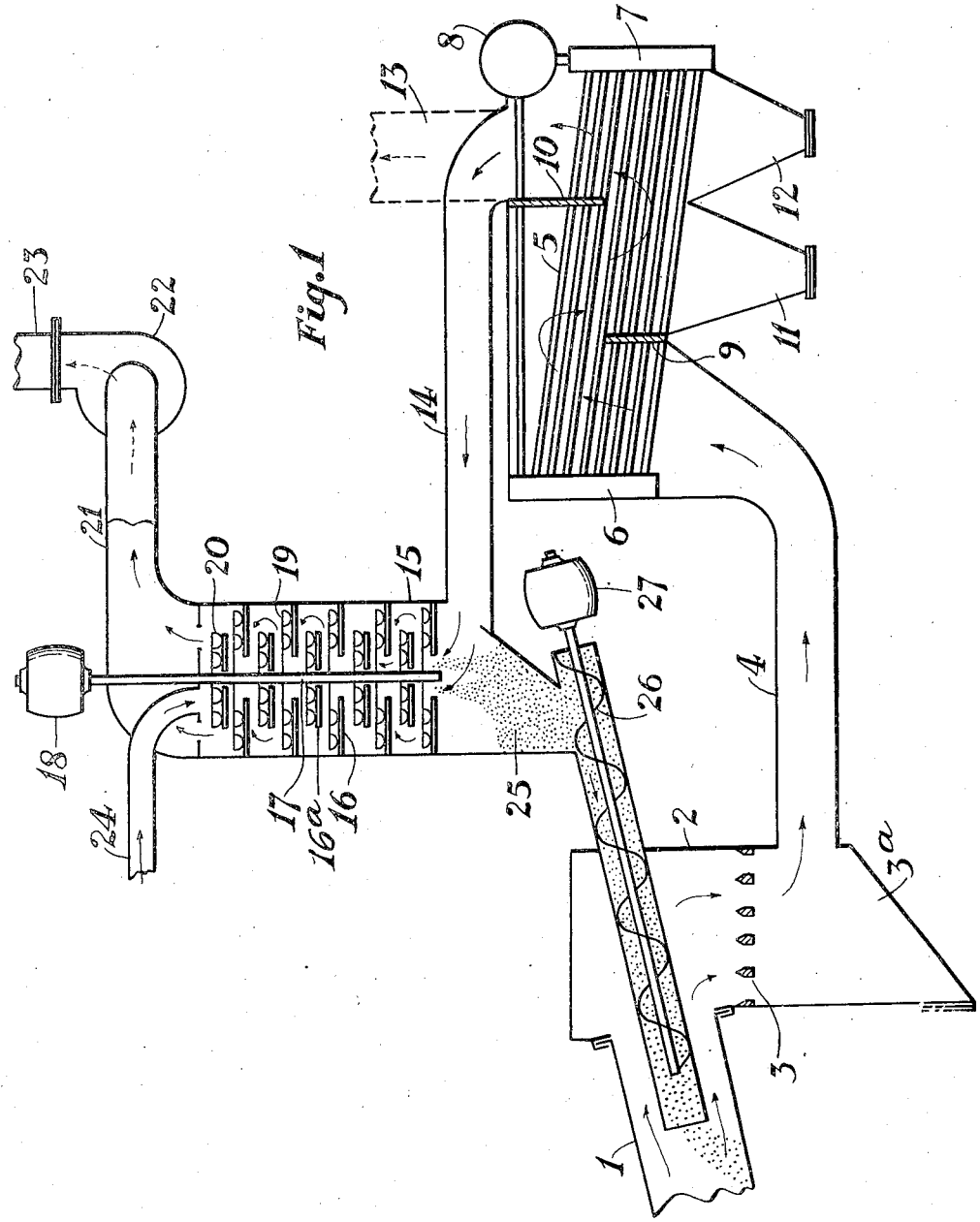
Fig. 1 is a longitudinal section of the exit end of the kiln and apparatus connected therewith.

Referring first to Fig. 1, the rotary kiln is indicated at 1. The gas therefrom is discharged into a header 2. In the header, below the discharge, is a damper 3 for regulating the outflow of gas. At the lower end of the header is a dust pocket 3ᵃ. The gas passes by a conduit 4 into a boiler comprising inclined tubes 5, between headers 6 and 7, and a steam drum 8. Baffles 9 and 10 direct the gases over the tubes, and dust pockets 11 and 12 catch additional quantities of dust.

The gas from the boiler may pass by way of a flue 13 to an economizer and thence to a dryer for the material entering the kiln. It is preferable, however, to lead the gas from the waste heat boiler through a flue 14 direct to the dryer, using other means for heating the boiler feed water.

The dryer illustrated is of the contact type comprising a cylindrical tower through which the gas passes from bottom to top. At intervals in the height there are annular trays 16 and central tray 16ᵃ. A centrally arranged shaft 17 is rotated by an overhead motor 18 and carries two sets of rotary plows arranged alternately. The plows 19 engage the material on the trays and gradually force it inward to the center where it drops on the plows 20 which gradually force it outward to drop on the next lower tray. The hot gas passes upward in contact with the material and out through the flue 21 and exhaust fan 22 to the stack 23. The wet ground material in the form of a slurry is fed in at the top through a pipe 24. It is heated and dried, completely or partially, in the course of its descent and falls into a hopper 25 whence it is carried by a screw conveyor 26 actuated by a motor 27 into the upper end of the kiln.

It is common to use waste heat boilers. The present process, however, is operated to effect a considerable saving beyond that resulting from the use of such boilers. The installation is designed to maintain a high temperature of the gas at the exit from the boiler, say 500 to 600 degrees F. (or 300 to 400 degrees F. after passing through an economizer). With a temperature of 550 degrees for the flue gas from the boiler and about 100 degrees for the gas leaving the slurry dryer, about 80 per cent of the water is evaporated from the slurry. Working in this way, there is a very substantial saving of coal or other fuel over the old method in which the dryers are fired separately and in a manner similar to that of firing the kilns.

For example, with the temperatures above stated, the calculated economy for an ordinary modern plant amounts to 10 or 12 per cent of the fuel burned. Stated in another way, the figures indicate a saving of more than a short ton of coal per hour in operating a 4000 barrel plant.

Various other methods may be used for applying the heat of the exhaust gas from the kiln, the waste heat boiler or the economizer to the material before it enters the kiln. Direct contact methods such as that of Fig. 1 have the advantage of washing the gas and so far eliminating the dust remaining therein as to avoid the necessity of a dust collector, so that the cost of such a collector may be credited against the cost of the slurry dryer. But the slurry may be efficiently dried by passing it through passages separated from the gas by metal walls which may take any desired form, such, for example, as tubes or flat plates. Or indirect methods may be used wherein air, hot water or steam heated by the exhaust gas may be applied in various ways to the drying of the slurry.

Figure 2:
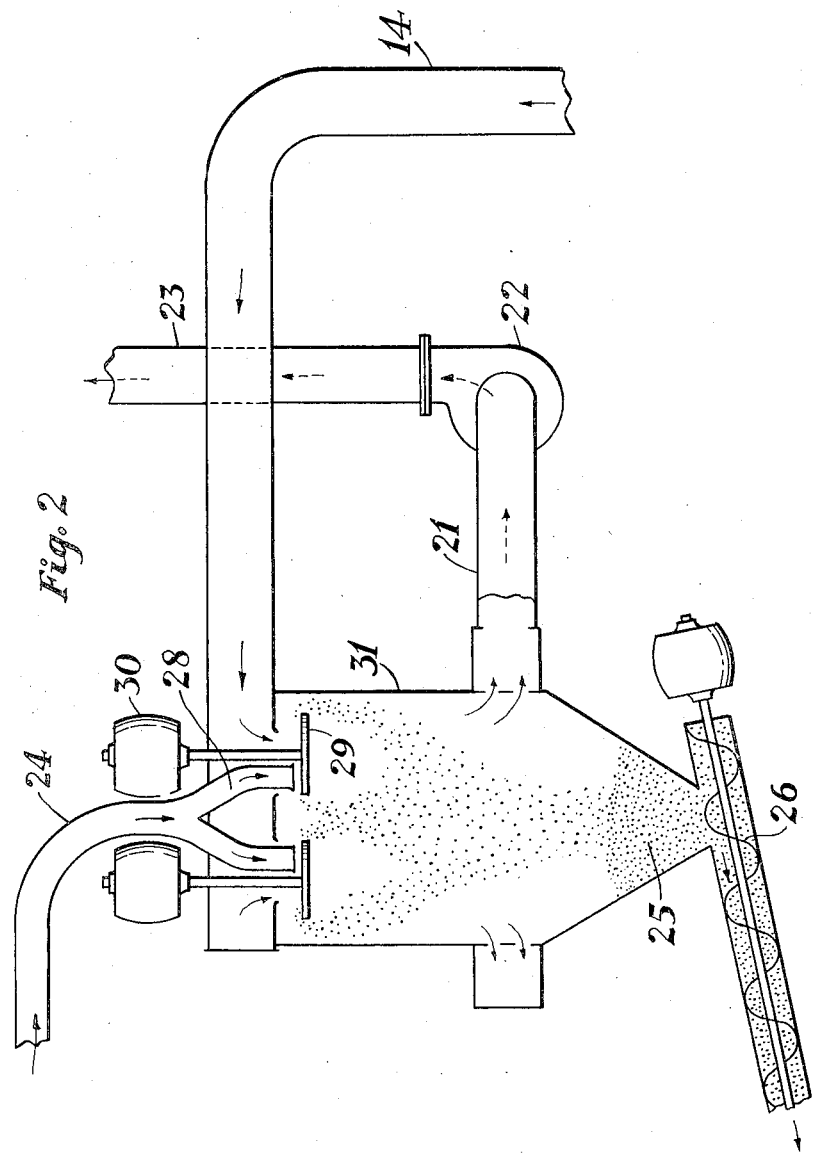
Fig. 2 is a similar view of a modification.

Fig. 2 illustrates a second contact method. The exhaust flue 14 directs the hot gas over the slurry at the latter is lead through branch pipes 28 to revolving plates or centrifugal mixers 29 actuated by motors 30. The gas passes out near the bottom of the mixer chamber 31 to the exhaust flue 21. The dried or heated slurry drops to a hopper 25 whence it is fed to a kiln; the remaining part of the installation being similar to that of Fig. 1.

The exhaust gas may be used by bubbling it through the slurry or passing it over the surface of the latter, or by other direct contact methods.

The invention is applicable also with considerable economy to dry processes of making cement; in that case the exhaust gas would be used for the drying and preliminary heating of the raw material to be fed to the kiln instead of the slurry used in the wet process.

Figure 4:
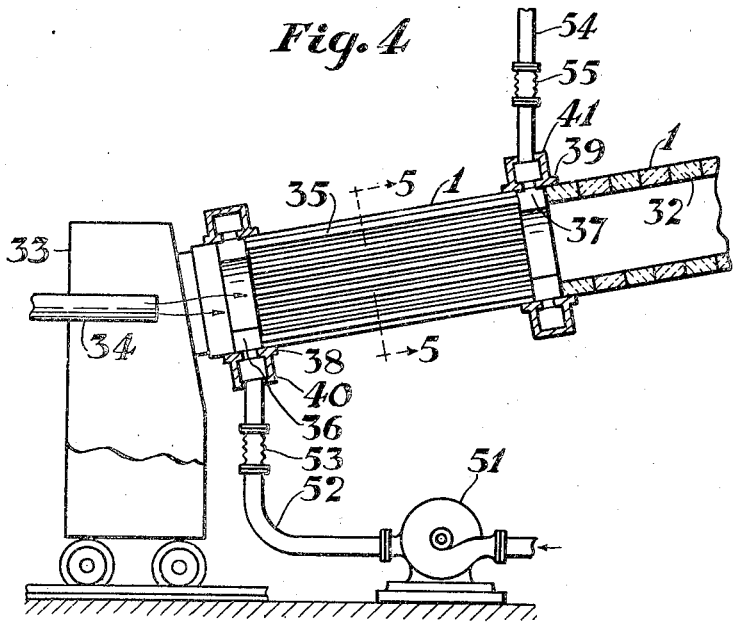
Fig. 4 is a similar view of an alternative to Fig. 3.
Figure 5:
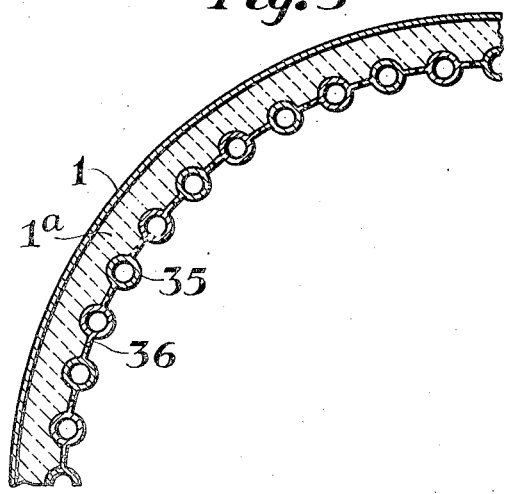
Fig. 5 is a cross-section on the line 5—5 of Fig. 4.

Instead of taking the gas from the exit end of the kiln for generating steam or heating water, part of the heat of the gas may be extracted for this purpose within the kiln. This is particularly applicable to plants having kilns fired by nozzle burners forming jets of coal, oil or gas. Such methods are illustrated in Figs. 3, 4 and 5.

Figure 3:
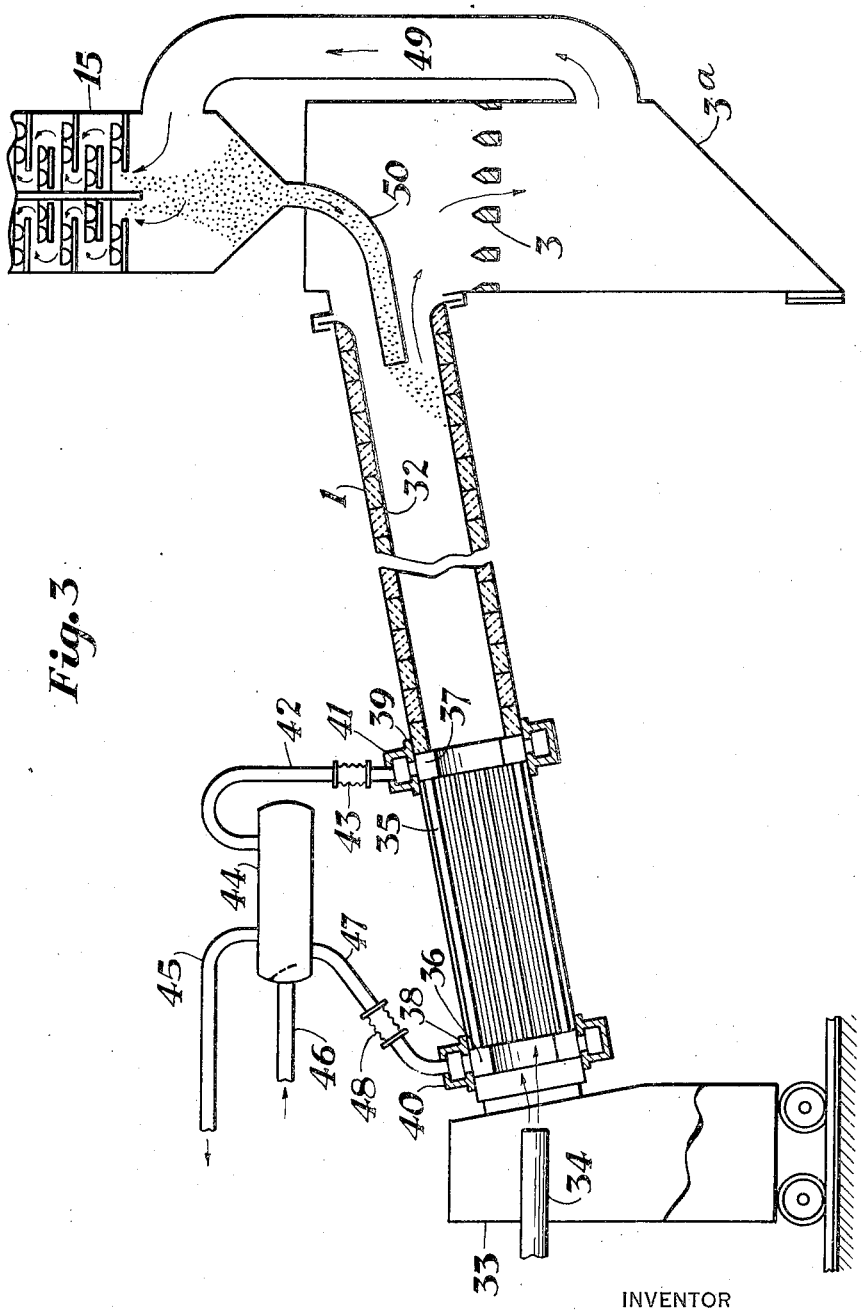
Fig. 3 is a similar view of another modification.

Fig. 3 shows the kiln 1 lined for the major part of its length with a refractory lining 32 and at its lower end a housing 33 which is on rollers and which houses a coal dust nozzle or burner 34 projecting a flame into the kiln. Within the shell of the kiln the lower portion has a lining of water tubes 35 instead of the refractory material 32. The tubes may be spaced apart as in Fig. 5 and have longitudinal fins 36 welded to them and overlapping or substantially closing the intermediate spaces, though free to expand and contract independently, and may be backed by refractory material 1ª.

Other styles of lateral extensions or fillers may be used. Or such extensions may be omitted, the tubes being arranged close together or being spaced apart from one another according to the conditions within the kiln. The jet of flame can be regulated to give a very high temperature and a surplus of heat compared with that which is ordinarily used.

In the usual refractory lined kiln, it is necessary to avoid the highest temperature attainable with nozzle burners in order to safeguard the refractory lining. The temperature is maintained below the danger point by the use of excess air. The higher temperature could be used as far as the burning of the cement is concerned, but a compromise is made in order to decrease the maintenance charges for refractory linings. The water wall of tubes, however, permits the operating of the burners at the highest available temperatures and with beneficial results in the manufacture of the cement. At the same time, it provides hot water or steam, giving a heat credit to the kiln.

Fig. 3 shows a steam installation. The tubes communicate at their ends with annular headers 36 and 37 surrounded by perforated rings 38 and 39 on the outside which form the inner faces of annular channels 40 and 41 within which the kiln rotates. Connected to the upper channel 41 is a steam pipe 42 with a flexible connection 43 to allow for irregular movement of the kiln. The steam pipe leads into a drum 44 from which the steam is taken off through a pipe 45. Feed water from a pipe 46 enters the drum, and the water from the drum passes by a pipe 47 with a flexible joint 48 to the channel 40 and thence to the lower header 36.

The gas discharged from the upper end of the kiln is still hot enough to be used for drying the material and is passed by a flue 49 to a slurry dryer 15 similar to that of Fig. 1, or any other drying apparatus as previously explained. Where the material is dry enough it may feed into the kiln through a pipe 50 by gravity. Or if necessary a screw feed may be used as in Fig. 1.

A similar water tube lining may be added farther along the kiln, to serve the purpose of an economizer in heating water to be supplied to the steam generator. Or a water heater may be substituted for the steam generator of Fig. 3.

Fig. 4 shows a hot water system operated through the water tube lining, the rest of the structure being like that of Fig. 3. A feed pump 51 forces water through a pipe 52 with a flexible connection 53 to the lower channel 40, whence it passes up through the header 36 and tubes 35 and upper header 37 to the channel 41 and thence through a pipe 54 with a flexible joint 55 to the point of utilization.

Whatever design of apparatus is used, it is so proportioned and operated as to leave a surplus after generating steam or heating feed water or both, which can be efficiently applied to the preliminary drying of the material.

Various other modifications may be made by those skilled in the art without departing from the invention as defined in the following claims.

I claim:

1. An apparatus for the production of cement comprising a rotary kiln, a nozzle burner projecting a flame therein and a water wall within the lower end of the kiln, said water wall comprising longitudinal tubes lining the shell, headers at opposite ends of said tubes and means for circulating water through said tubes from the lower to the upper ends and taking off hot water or steam from the upper header.

2. Apparatus for the production of cement comprising a rotary kiln, a nozzle burner projecting a flame therein and a water wall within the lower end of the kiln, said water wall comprising longitudinal tubes lining the shell and having flanges extending from said tubes to close the spaces between said tubes, and means for circulating water through said tubes.

WALTER M. KEENAN.